United States Patent
Golden et al.

(10) Patent No.: US 12,056,522 B2
(45) Date of Patent: Aug. 6, 2024

(54) HIERARCHICAL ASYMMETRIC CORE ATTRIBUTE DETECTION

(71) Applicant: ADVANCED MICRO DEVICES, INC., Santa Clara, CA (US)

(72) Inventors: Michael L. Golden, Santa Clara, CA (US); Paul Blinzer, Carnation, WA (US); Magiting M. Talisayon, Newton, MA (US); Srikanth Masanam, Hyderabad (IN); Ripal Butani, Bangalore (IN); Upasanah Swaminathan, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 365 days.

(21) Appl. No.: 17/530,936

(22) Filed: Nov. 19, 2021

(65) Prior Publication Data

US 2023/0161618 A1    May 25, 2023

(51) Int. Cl.
G06F 9/44    (2018.01)
G06F 9/48    (2006.01)

(52) U.S. Cl.
CPC ...... *G06F 9/4881* (2013.01); *G06F 2209/482* (2013.01)

(58) Field of Classification Search
CPC .................................................. G06F 9/4881
USPC ........................................................ 718/102
See application file for complete search history.

(56) References Cited

U.S. PATENT DOCUMENTS

| | | | | |
|---|---|---|---|---|
| 8,087,029 | B1* | 12/2011 | Lindholm | G06F 9/3851 714/1 |
| 2006/0123423 | A1* | 6/2006 | Brenner | G06F 9/5083 718/105 |
| 2014/0130058 | A1* | 5/2014 | Hum | G06F 9/5088 718/105 |
| 2016/0139964 | A1 | 5/2016 | Chen et al. | |

OTHER PUBLICATIONS

Cheng et al. "LAP: Loop-Block Aware Inclusion Properties for Energy-Efficient Asymmetric Last Levels Caches," ACM/IEEE 43rd Annual International Symposium on Computer Architecture, 2016, 13 pages.
International Search Report and Written Opinion issued in Application No. PCT/US2022/050061, mailed Mar. 20, 2023, 10 Pages.
International Preliminary Report on Patentability issued in Application No. PCT/US2022/050061, mailed May 30, 2024, 7 Pages.

* cited by examiner

*Primary Examiner* — Timothy A Mudrick

(57) ABSTRACT

Within a processing system, thread count asymmetries manifest when one or more cores of a processing device are disabled. To determine such thread count asymmetries, discovery operations are performed to determine thread count asymmetries for one or more hierarchy levels of a processing device based on a number of threads per enumerated instance within the hierarchy level. In response to the determining a thread count asymmetry, one thread identifier for each enumerated instance within the asymmetric hierarchy level is defined to determine a representation of the asymmetry. Using the representation of the symmetry, software tasks associated with one or more application within the processing system are performed.

20 Claims, 4 Drawing Sheets

HIERARCHICAL ASYMMETRIC CORE ATTRIBUTE DETECTION

BACKGROUND

Within processing systems, operating systems use processor topology information of one or more processors to perform software tasks associated with applications. For example, the operating systems use processor topology information to perform a number of processor-resource management practices, such as task and thread scheduling, for the software tasks associated with the applications. The processor topology information of the processors identifies the hierarchical arrangement of the hardware and software resources within the processing system that are used to perform the software tasks of the applications. However, core attribute asymmetries within a processing system can cause the operating systems to inefficiently or incorrectly manage the hardware and software resources of the processors, which can negatively impact the processing efficiency and processing times of the applications. Additionally, such asymmetries can cause the operating systems to use additional memory and processing resources when compensating for the asymmetries.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
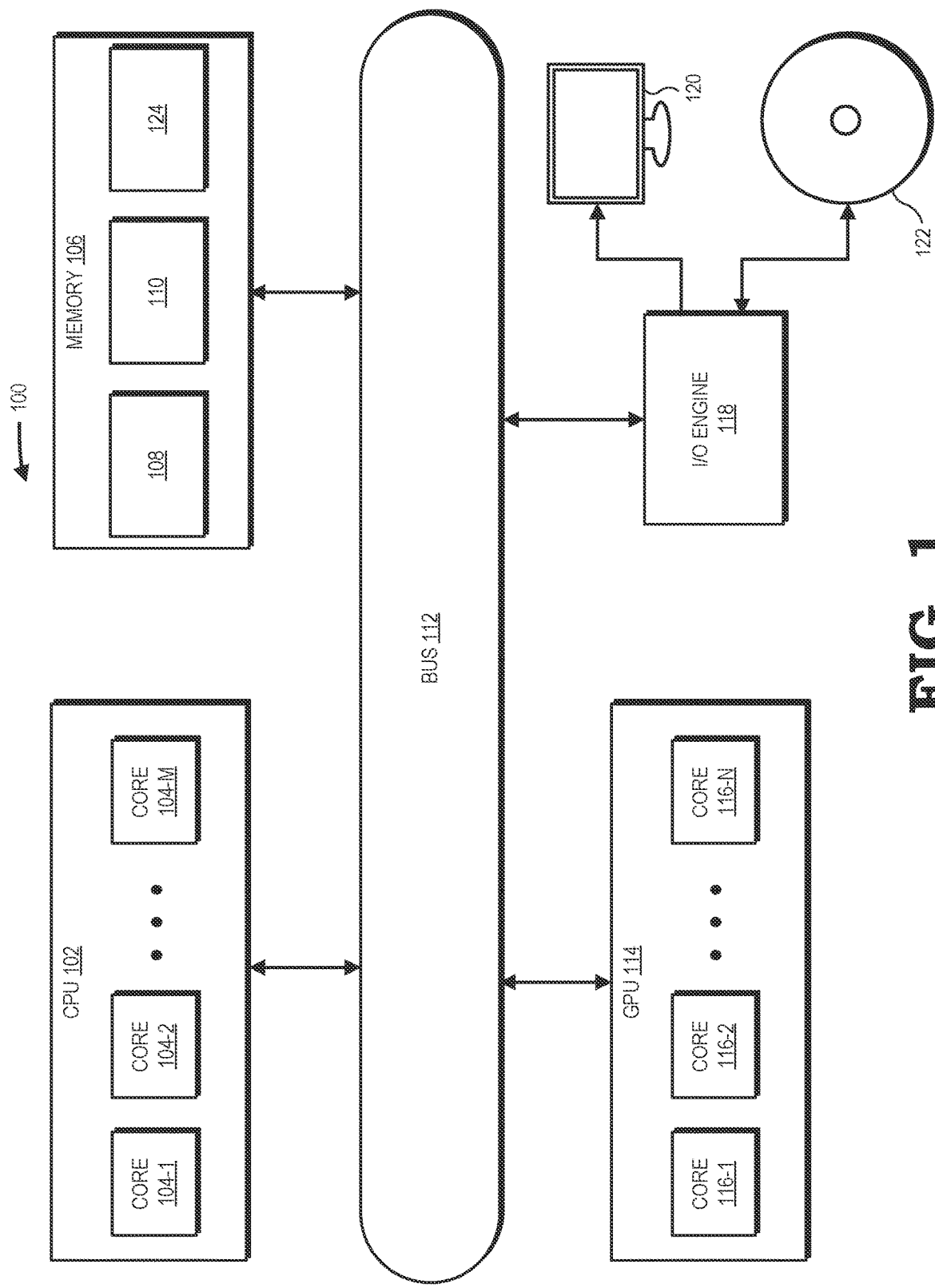
FIG. 1 is a block diagram of a processing system for hierarchical asymmetric core attribute detection, in accordance with some embodiments.

Techniques and systems described herein address determining thread count asymmetries within the topology of a processing device and reporting the identified asymmetry via a relatively small number of thread identifiers (e.g., via a single thread identifier for a given enumerated instance of the processing device). The described techniques and systems thereby support efficient reporting of the asymmetries, allowing more efficient asymmetry management, such as more efficient scheduling of threads for execution at the processing device.

To illustrate, as used herein, a "topology" of a processing devices includes the arrangement of the hardware and software resources of a processing device into one or more hierarchy levels. A "hierarchy level," as used herein, includes one or more portions of the processing device that include like hardware or software resources (also referred to herein as "enumerated instances") of the processing device. For example, a processing device includes a die hierarchy level that includes one or more dies. As another example, a processing device includes a core complex hierarchy level that includes one or more core complexes. Each level is "hierarchical" in that hierarchy levels including larger portions of the processing device (e.g., the die level) is a "higher" level than hierarchy levels that include smaller portions of the processing device (e.g., core complex level, core level). The enumerated instances of a hierarchy level include one or more hardware or software resources from other (e.g., lower) hierarchy levels. For example, a die of a die level includes one or more core complexes from a core complex level.

In some embodiments, a processing device is configured to determine thread count asymmetries for one or more hierarchy levels of the processor based on a number of threads per enumerated instance of the hierarchy level (i.e., how many threads each enumerated instance has within a hierarchy level). When one or more cores of a processing device in a processing system are downcored (e.g., disabled), thread count asymmetries will sometimes manifest at one or more hierarchy levels of a processing device between the enumerated instances of the hierarchy level. That is to say, the number of threads per enumerated instance within a hierarchy level will differ as a result of the downcored cores. To provide a representation of these thread count asymmetries to operating systems managing one or more applications running or seeking to run on the processing device, the operating systems of the processing system perform discovery operations to determine if there are any thread count asymmetries at any hierarchy levels of the processing device. Based on the discovery operations, the operating systems determine whether there is one or more thread count asymmetries for each hierarchy level of the processing device. That is to say, the operating systems determine whether each hierarchy level is symmetric or asymmetric with regards to thread count.

In response to determining a thread count asymmetry for a hierarchy level, the operating systems define one thread identifier per enumerated instance of the hierarchy level to determine a representation of the asymmetry. To define the thread identifiers, the operating systems only read one thread identifier per enumerated instance from the registers. Because each thread identifier includes a number of threads for its enumerated instance, only one thread identifier from each enumerated instance needs to be read to determine a representation of the thread count asymmetry. In this way, the operating systems do not need to read every thread identifier of a hierarchy level, reducing the processing time and resources needed to determine the representation of asymmetry.

Techniques and systems described herein address determining power efficiency asymmetries for one or more hierarchy levels of a processing device based on a number of cores per enumerated instance operating in respective operating modes, for example, power efficiency modes and performance modes. When the number of cores of a processing device operating in a power efficiency mode differs from the number of cores operating in a performance mode, power efficiency asymmetries will sometimes manifest at one or more hierarchy levels of a processing device between the enumerated instances of the hierarchy level. A processing device determines such power efficiency asymmetries at one or more hierarchy levels of the processing device by, for example, comparing the number of cores operating in first or second operating modes per enumerated instance of the hierarchy level. To provide a representation of these power efficiency asymmetries to applications running or seeking to run on the processing device, operating systems of the processing system perform discovery operations to determine if there are any power efficiency asymmetries at any hierarchy levels of the processing device. For example, the operating systems provide instructions to the processing device causing the processing device to store data representing power efficiency asymmetries at respective hierarchy levels in one or more registers. The operating system then reads the data in the registers to determine if any power efficiency asymmetries are present for one or more hierarchy levels.

FIG. 1 is a block diagram of a processing system 100 for asymmetric core attribute detection, according to some embodiments. The processing system 100 includes or has access to a memory 106 or other storage component implemented using a non-transitory computer-readable medium, for example, a dynamic random-access memory (DRAM). However, in embodiments, the memory 106 is implemented using other types of memory including, for example, static random-access memory (SRAM), nonvolatile RAM, and the like. According to embodiments, the memory 106 includes an external memory implemented external to the processing units implemented in the processing system 100. The processing system 100 also includes a bus 112 to support communication between entities implemented in the processing system 100, such as the memory 106. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly parallel processors, artificial intelligence (AI) processors, inference engines, machine learning processors, other multithreaded processing units, and the like), scalar processors, serial processors, or any combination thereof. FIG. 1 illustrates an example of a parallel processor and in particular a graphics processing unit (GPU) 114, in accordance with some embodiments. The GPU 114 renders images for presentation on a display 120. For example, the GPU 114 renders objects to produce values of pixels that are provided to the display 120, which uses the pixel values to display an image that represents the rendered objects. The GPU 114 implements a plurality of processor cores 116-1 to 116-N that execute instructions concurrently or in parallel. According to embodiments, one or more processor cores 116 operate as SIMD units that perform the same operation on different data sets. Though in the example embodiment illustrated in FIG. 1, three cores (116-1, 116-2, 116-N) are presented representing an N number of cores, the number of processor cores 116 implemented in the GPU 114 is a matter of design choice. As such, in other embodiments, the GPU 114 can include any number of cores 116. Some embodiments of the GPU 114 are used for general-purpose computing. The GPU 114 executes instructions such as program code 108 stored in the memory 106 and the GPU 114 stores information in the memory 106 such as the results of the executed instructions.

The processing system 100 also includes a central processing unit (CPU) 102 that is connected to the bus 112 and therefore communicates with the GPU 114 and the memory 106 via the bus 112. The CPU 102 implements a plurality of processor cores 104-1 to 104-N that execute instructions concurrently or in parallel. In embodiments, one or more of the processor cores 104 operate as SIMD units that perform the same operation on different data sets. Though in the example embodiment illustrated in FIG. 1, three cores (104-1, 104-2, 104-M) are presented representing an M number of cores, the number of processor cores 104 implemented in the CPU 102 is a matter of design choice. As such, in other embodiments, the CPU 102 can include any number of cores 104. In some embodiments, the CPU 102 and GPU 114 have an equal number of cores 104, 116 while in other embodiments, the CPU 102 and GPU 114 have a different number of cores 104, 116. The processor cores 104 execute instructions such as program code 110 stored in the memory 106 and the CPU 102 stores information in the memory 106 such as the results of the executed instructions. The CPU 102 is also able to initiate graphics processing by issuing draw calls to the GPU 114. In embodiments, the CPU 102 implements multiple processor cores (not shown in FIG. 1 in the interest of clarity) that execute instructions concurrently or in parallel.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the GPU 114, or the CPU 102. In the illustrated embodiment, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the GPU 114 or the CPU 102.

In embodiments, memory 106 includes one or more operating systems 124 that each include software configured to manage the hardware and software resources of system 100. Operating systems 124 interact with the hardware and software resources of system 100 so that one or more applications (not shown for clarity) have access to the hardware and software resources of system 100. For example, operating systems 124 fulfill one or more system calls on behalf of one or more applications, interrupt one or more applications, perform one or more hardware functions (e.g., memory allocation, inputs, outputs) for one or more applications, or any combination thereof, to name a few. In embodiments, operating systems 124 are configured to perform one or more discovery operations to determine one or more hardware and software resources of system 100. Such hardware and software resources include, for example, processing devices (e.g., CPU 102, GPU 114), device hierarchies, processing cores (e.g., cores 104, 116), threads, sockets, dies, complexes, or any combination thereof, to name a few. According to embodiments, operating systems 124 are further configured to perform one or more discovery operations to determine one or more hardware and software resource attributes of the hardware and software resources of system 100. Such attributes include, for example, the quantity of a resource (e.g., thread count), the operating mode of a resource (e.g., active, inactive, power efficiency mode, performance mode), power efficiency of a resource, or any combination thereof, to name a few. In embodiments, one or more hardware and software resources of system 100 include one or more hierarchy levels. For example, one or more portions of a processing device are arranged in one or more hierarchy levels. In embodiments, a hierarchy level includes one or more like enumerated instances (i.e., like portions) of a device, for example, cores, core complexes, dies, and sockets, to name a few. As an example, a processing device (e.g., CPU 102, GPU 114) includes four or more hierarchy levels that include, for example, a core level, a core complex level, a die level, and a socket level, to name a few. In embodiments, each enumerated instance of a hierarchy level includes one or portions of a device from a different hierarchy level, for example, a lower hierarchy level. As an example, a die level includes one or more core complexes which each include one or more cores. According to embodiments, the discovery operations include instructions for a processing device to store data representing one or more hardware and software resources, hardware and software resource attributes, hierarchy levels, or any combination thereof in one or more memory registers.

According to embodiments, operating systems 124 perform one or more discovery operations to determine one or more asymmetries for one or more hierarchy levels of a hardware resource of system 100. An "asymmetry," as used herein, includes one or more enumerated instances (e.g., cores, core complexes, dies) within a hierarchy level having one or more different hardware attributes (e.g., operating modes, thread counts). For example, at a core complex level including two core complexes, an asymmetry includes a different thread count (i.e., quantity of threads) between the two core complexes. As another example, at a die level including two dies, an asymmetry includes a first number of cores operating in a power efficiency mode within the first die and a second, different number of cores operating in a power efficiency mode within the second die. In embodiments, the discovery operations include instructions causing a processing device to load data representing one or more asymmetries and one or more hierarchy levels into one or more registers. The operating systems then determine one or more asymmetries for one or more hierarchy levels by reading at least a portion of the data stored in the registers.

In response to determining one or more asymmetries, operating systems 124 are configured to define one thread identifier for each enumerated instance (e.g., each discrete portion) of a hierarchy level. For example, in response to determining one or more asymmetries at a core complex level, operating systems 124 are configured to send instructions causing a processing device to store data representing the thread identifiers for each thread in a hierarchy level. A "thread identifier," as used herein, includes, for example, data indicating a unique key that identifies a thread, the enumerated instances at each level of a hierarchy that include the thread, the number of threads within each enumerated instance including the thread, or any combination thereof. For example, each thread identifier indicates the number of other threads within an enumerated instance. In embodiments, operating systems 124 send instructions causing a processing device to generate and store thread identifiers for each thread of a hierarchy level based on one or more shift values stored in one or more registers. For example, operating systems 124 send instructions causing a processing device to store data representing unique keys identifying each thread (e.g., APICIDs) in a first register and, in a second register, a value indicating a bit shift that, when applied to the unique key identifying the thread, will return a unique key identifying a higher level of topology, for example, a core, core complex, die, socket, or any combination thereof. According to embodiments, operating systems 124 are configured to read only one thread identifier per each enumerated instance of a hierarchy level to determine a representation of the asymmetry in the hierarchy level. For example, based on the shift values, the operating systems determine one thread identifier per enumerated instance within the register to read. In this way, operating systems 124 determine a representation of the asymmetry (e.g., how the asymmetry affects the threads) without having to read the thread attributes for each thread of a hierarchy level, reducing the processing time needed to determine the representation of the asymmetry. That is to say, because each thread identifier indicates the number of threads per enumerated instance, the operating systems 124 only need to read one thread identifier per enumerated instance reducing the processing time needed to determine the representation of the asymmetry. According to embodiments, operating systems 124 then allow one or more applications access to at least a portion of the hardware of system 100 based on the representation of the asymmetry. For example, operating systems 124 allow access to one or more threads of system 100 based on the representation of the asymmetry. As an example, operating systems 124 schedule software tasks for the application based on the thread counts indicated in the representation of the asymmetry.

Figure 2:
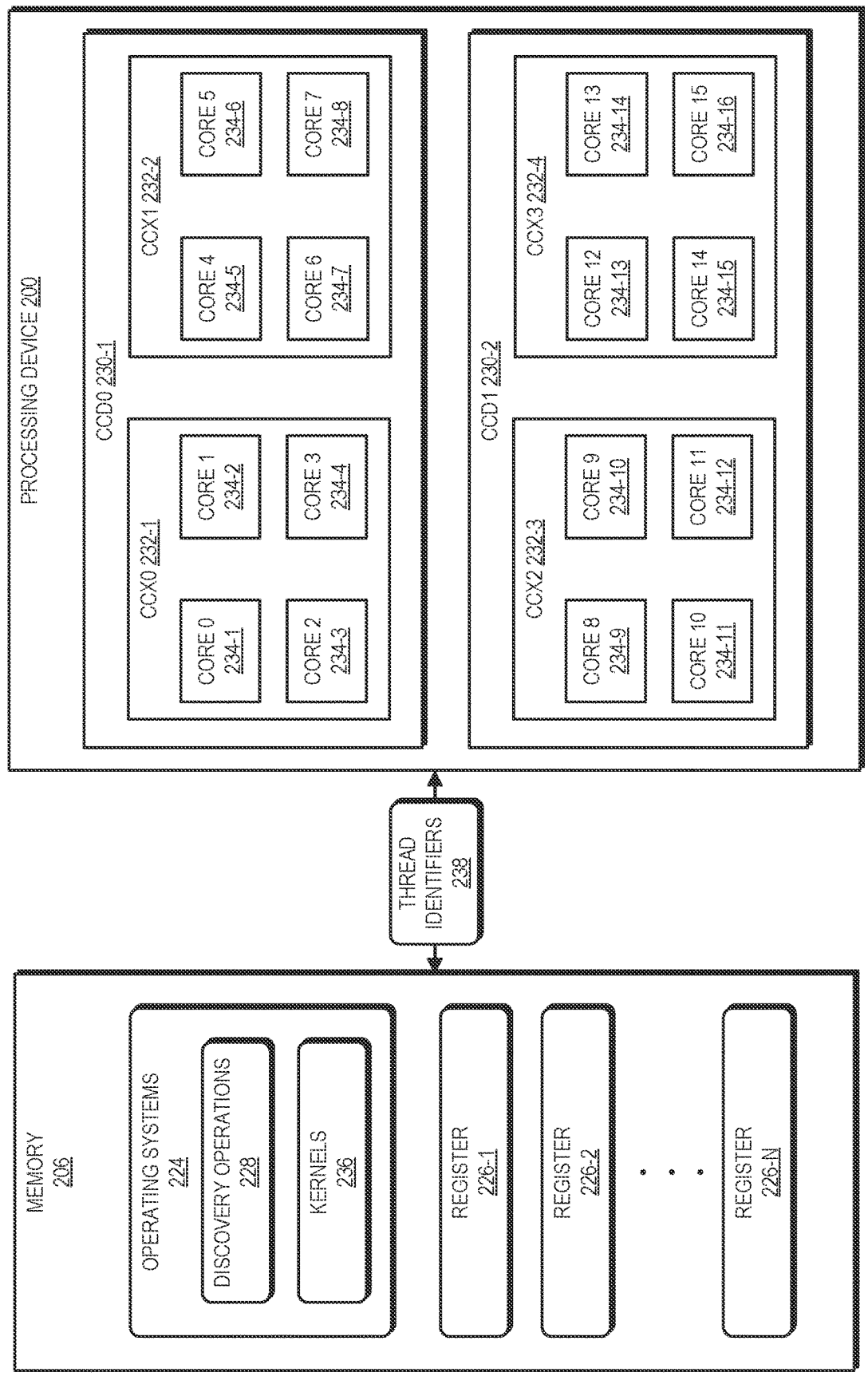
FIG. 2 is a block diagram of a processing device configured to determine one or more core attribute asymmetries in one or more hierarchy levels, in accordance with some embodiments.

Referring now to FIG. 2, a block diagram of a processing device 200 having one or more hardware hierarchy levels and one or more asymmetries is presented. In embodiments, the processing device 200 implements aspects of processing system 100 as described in FIG. 1. For example, processing device 200 may be similar or the same as CPU 102, GPU 114, or both as described in FIG. 1. In embodiments, processing device 200 includes a first hierarchy level that includes, for example, one or more cores 234, each similar to or the same as cores 104, 116. For example, in the example embodiment illustrated in FIG. 2, processing device 200 includes a first hierarchy level (e.g., core level) that includes core 0 234-1 to core 15 234-16. Though in the illustrative embodiment of FIG. 2 a first hierarchy level of processing device 200 is presented as having 16 cores (234-1, 234-2, 234-3, 234-4, 234-5, 234-6, 234-7, 234-8, 234-9, 234-10, 234-11, 234-12, 234-13, 234-14, and 234-15), in other embodiments a first hierarchy level of processing device 200 can have any number of cores, for example, 4, 8, 32, 64, 128, or 256 cores, to name a few.

According to embodiments, processing device 200 includes a second hierarchy level (e.g., core complex level) that includes, for example, one or more core complexes (CCXs). A "core complex," as used herein, includes one or more pairs of cores 234 and one or more caches (not shown for clarity). In embodiments, the cores 234 within a CCX are connected to each other by one or more caches. That is to say, the cores 234 within a CCX share one or more caches of the CCX. For example, in the example embodiment of FIG. 2, processing device 200 includes a second hierarchy level (e.g., CCX level) that includes CCX0 232-1 (including cores 234-1 to 234-4), CCX1 232-2 (including cores 234-5 to 234-8), CCX2 (including cores 234-9 to 234-12), and CCX3 232-4 (including cores 234-13 to 234-16). Though in the illustrative embodiment of FIG. 2 a second hierarchy level of processing device 200 is presented as having four CCXs each having four cores, in other embodiments, a second hierarchy level of processing device 200 can include any number of CCXs each having any respective number of cores.

According to embodiments, processing device 200 includes a third hierarchy level (e.g., die level) that includes, for example, one or more dies (e.g., core complex dies (CCDs)). Each die or CCD 230 includes a circuit that includes one or more CCXs 232 that each includes one or more cores 234. For example, in the example embodiment of FIG. 2, processing device 200 includes a third hierarchy level (e.g., CCD or die level) that includes CCD0 230-1 (including CCX0 232-1 and CCX1 232-2) and CCD1 230-2 (including CCX2 232-3 and CCX3 232-4). Though in the illustrative embodiment of FIG. 2 a third hierarchy level of processing device 200 is presented as having two CCDs each having two CCXs, in other embodiments, a third hierarchy level of processing device 200 can include any number of CCDs each having any respective number of CCXs. In embodiments, one or more CCXs 232 within a CCD 230 are connected to each other by one or more caches, data fabrics, or any combination thereof. For example, within CCD0 23-1, CCX0 232-1 and CCX1 232-2 are connected by a data fabric.

In embodiments, processing device 200 includes a fourth hierarchy level (e.g., socket level) that includes, for example, one or more sockets. A "socket," as used herein, includes an interface between processing device 200 and one or more other circuits (e.g., a motherboard), for example, one or more pins. According to embodiments, a socket includes one or more CCDs 230 connected to one another by one or more caches, data fabrics, or any combination thereof. For example, in the example embodiment of FIG. 2, processing device 200 includes a fourth hierarchy level (e.g., socket level) that includes a socket (not shown for clarity) that includes CCD0 230-1 and CCD1 230-2 connected by a data fabric (not shown for clarity). Though in the illustrative embodiment of FIG. 2 a fourth hierarchy level of processing device 200 is presented as having one socket that includes two CCDs, in other embodiments, a fourth hierarchy of the processing device 200 can include any number of sockets each including any number of CCDs.

According to embodiments, processing device 200 is configured to downcore one or more cores 234 of processing device 200. "Downcoring," as used herein, includes disabling one or more cores 234, for example, by fuse disabling, software disabling, or both, to produce a disabled core. According to embodiments, in response to one or more cores 234 being downcored, thread count asymmetries (i.e., different thread counts between the enumerated instances of a hierarchy level) at one or more hierarchies of processing device 200 will sometimes manifest. For example, by downcoring one or more cores 234, one or more enumerated instances (e.g., cores, CCXs, CCDs) of one or more hierarchy levels (e.g., core level, CCX level, CDD level, socket level) may have a different thread count from another enumerated instance at the same hierarchy level. One of ordinary skill in the art will appreciate that as the number of cores in an enumerated instance that are downcored increases, the number of threads in that enumerated instance decreases. As an example, in the example embodiment of FIG. 2, in response to downcoring core 2 234-3 and core 3 234-4, CCX0 232-1 would have a different number of threads from CCX1 232-2. In other words, there is a thread count asymmetry at the CCX hierarchy level as there is a different number of threads per CCX. As another example, in the example embodiment of FIG. 2, in response to downcoring core 4 234-5, core 12 234-13, core 13 234-14, and core 14 234-15, there is a thread count asymmetry at the CCD level as there is a different number of threads per CCD and a thread count asymmetry at the CCX level as there is a different number of threads per CCX.

In embodiments, processing device 200 is configured to change the operating mode of one or more cores 234, for example, between a power efficiency mode and a performance mode. A "power efficiency mode," as used herein, includes one or more instructions for a core 234 to operate such that power consumption is minimized by the core (i.e., power efficiency is maximized) and a "performance mode," as used herein, includes one or more instructions for a core 234 to operate such that computing performance is maximized for the core. In some embodiments, one or more cores are designed to only operate in a power efficiency more or a performance mode. In response to changing one or more cores from a power efficiency mode to a performance mode, a performance mode to a power efficiency mode, or both, power efficiency asymmetries at one or more hierarchy levels will sometimes manifest. Additionally, in response to a processing device including a first number of cores designed to operate only in a power efficiency mode and a second number of cores designed to operate only in a performance mode, power efficiency asymmetries at one or more hierarchy levels will sometimes manifest. For example, in response to the number of cores in a performance mode within an enumerated instance (e.g., core, CCX, CCD) differing from the number of cores in performance mode within another enumerated instance at the same hierarchy level, a power efficiency asymmetry for that hierarchy level manifests. Similarly, in response to the number of cores in power efficiency mode within an enumerated instance (e.g., core, CCX, CCD) differing from the number of cores in power efficiency mode within another enumerated instance at the same hierarchy level, a power efficiency asymmetry for that hierarchy level manifests. As an example, in response to CCX0 232-1 having four cores (234-1 to 234-4) in a power efficiency mode and CCX1 232-2 having four cores (234-5 to 234-8) in a performance mode, a power efficiency asymmetry would manifest for the CCX hierarchy level as CCX0 and CCX1 have asymmetric power efficiencies.

In embodiments, processing device 200 is configured to determine one or more hardware and software resources, hardware and software resource attributes, asymmetries (e.g., thread count asymmetries, power efficiency asymmetries), or any combination thereof, for one or more hierarchy levels of processing device 200. For example, processing device 200 uses microcode to determine one or more one or more thread counts, thread count asymmetries, power efficiency asymmetries, or any combination thereof. According to embodiments, processing device 200 is configured to determine one or more hardware and software resources, hardware and software resource attributes, asymmetries, or any combination thereof, during the startup of processing device 200. As an example, at startup, processing device 200 is configured to determine the number of threads per each enumerated instance (e.g., cores, CCXs, CCDs) in the processing device 200. As another example, processing device 200 is configured to determine one or more thread count asymmetries at a hierarchy level by performing one or more instructions, microcode, or any combination thereof, to compare the number of threads per enumerated instance (e.g., core, CCX, CCD, socket) to determine if the number of threads per enumerated instance differs within a hierarchy level. That is to say, whether one or more enumerated instances of a hierarchy level have a different number of threads from one or more other enumerated instances of the hierarchy level. In another example, processing device 200 is configured to use microcode to determine one or more power efficiency asymmetries at one or more hierarchy levels at startup. According to embodiments, processing device 200 is configured to store one or more determined hardware and software resources, hardware and software resource attributes, asymmetries, or any combination thereof, in a memory including, for example, a CMOS memory, a flash memory, a programmable read-only memory (PROM), an electronically erasable PROM, (EEPROM), RAM, cache, or any combination thereof, to name a few.

According to embodiments, processing device 200 includes or is connected to a memory 206, similar to or the same as memory 106. In embodiments, memory 206 includes one or more operating systems 224, similar to or the same as operating systems 124, and one or more registers 226-1 to 226-N. Though in the illustrated embodiment of FIG. 2, three registers (226-1, 226-2, 226-N) are presented representing an N number of registers, in other embodiments, memory 206 can include any number of registers. According to embodiments, one or more operating systems 224 each include one or more kernels 236 configured to interface or interact with processing device 200. For example, an operating system 224 includes a kernel 236 configured to interact with processing device 200 on behalf of one or more applications.

In embodiments, operating systems 224 are configured to perform one or more discovery operations 228, for example, CPUID operations, read model-specific register (RDMSR) operations, read operations for tables stored in memory 206, or any combination thereof, to determine one or more hardware resources, hardware attributes, asymmetries, or any combination thereof of processing device 200. In embodiments, one or more discovery operations 228 include one or more leaves of a discovery operation, for example, one or more CPUID leaves. According to embodiments, one or more discovery operations 228 include instructions for processing device 200 to store data representing requested hardware and software resources, hardware and software resource attributes, asymmetries (e.g., thread count asymmetries, power efficiency asymmetries), or any combination thereof, in one or more bits of registers 226. For example, discovery operations 228 include an instruction for processing device 200 to generate, store, or both, a datum representing a thread count asymmetry for a hierarchy level. In embodiments, the hardware and software resources, hardware and software resource attributes, asymmetries, or any combination thereof requested in a discovery operation 228 are determined by data stored in one or more bits of registers 226. That is to say, data stored in one or more bits of registers 226 determines what hardware and software resources, hardware and software resource attributes, asymmetries, or any combination thereof the processing device 200 is to identify by storing data in the registers 226. For example, based on one or more bits in a first in register 226-2, a discovery operation 228 includes instructions for processing device 200 to store data representing a power efficiency asymmetry of a hierarchy level in a second register 226-1. According to embodiments, one or more registers 226 stores one or more shift values, for example, one or more bit shift values. Based on the shift values stored in registers 226, a discovery operation 228 includes one or more instructions for processing device 200 to store one or more thread identifiers 238 for each enumerated instance of a hierarchy level in one or more bits of a register 226 based on the shift value. For example, the shift values indicate which bits of registers 226 a processing device 200 is to store thread identifiers 238. As an example, based on a shift value indicating a bit shift value of four stored in a first register 226-1, a discovery operation 228 includes one or more instructions for the processing device to store one or more thread identifiers 238 (e.g., APICIDS) in a second register 226-2. The stored thread identifiers 238 are shiftable by 16 bits to provide a unique key for a higher level of topology, e.g., core, core complex, die, or socket.

In embodiments, operating systems 224 are configured to determine one or more hardware resources, hardware attributes, asymmetries, or any combination thereof of processing device 200 by reading data from one or more bits stored in registers 226. For example, operating systems 224 determine one or more hardware and software resource attributes of processing device 200 by reading data in one or more bits of register 226-1 stored by processing device 200 during a discovery operation 228. According to embodiments, operating systems 224 provide one or more determined hardware and software resources, hardware and software resource attributes, asymmetries, or any combination thereof to one or more applications such that the applications run on at least a portion of processing device 200. For example, operating systems 224 schedule software tasks for the applications using one or more hardware and software resources of the processing device 200.

According to embodiments, in response to determining one or more thread count asymmetries at one or more hierarchy levels of processing device 200, operating systems 224 are configured to determine a representation of the thread count asymmetry at each hierarchy level of processing device 200. The representation of the thread count asymmetry includes, for example, the number of threads per enumerated instance of a hierarchy level. Determining a representation of the thread count asymmetry for each hierarchy level includes, for example, reading data from one or more registers 226 indicating thread identifiers 238 that identify the number of threads per enumerated instance at each hierarchy level. As an example, reading thread identifiers 238 from one or more registers 226 indicating the number of threads per each CCX at a CCX hierarchy level and threads per each CCD at a CCD hierarchy level. To determine a representation of the asymmetry, operating systems 224 are configured to only read data representing one thread identifier 238 per each enumerated instance in a hierarchy level from the registers 226. For example, for a CCX hierarchy level, operating systems 224 only read data representing one thread identifier 238 per each CCX from registers 226. According to embodiments, operating systems 224 are configured to read data representing one thread identifier 238 per each enumerated instance in a hierarchy level from the registers 226 based on a shift value stored in one or more registers 226. For example, based on a shift value indicating a bit shift of four (e.g., a logical bit shift right operation having a value of four resulting in thread identifiers that are even multiples of 16), operating systems 224 determine that the first thread identifier 238 per each respective enumerated instance is stored at a shifted location within the unique key for each thread (e.g., at a shifted location within the APICID). That is to say, the first thread identifier 238 for each respective enumerated instance is found in the unique key of a thread (e.g., APICID) 0, 16, 32, 48, etc. in a register 226. In this way, operating systems 224 only read data representing one thread identifier 238 per each enumerated instance in a hierarchy level from the registers 226 rather than every thread identifier 238 for the hierarchy level. As such, the processing time and memory resources needed to determine the representation of the asymmetry are reduced. In embodiments, the operating systems 224 use the representation of the asymmetry to provide access to the hardware and software resources of the processing device 200 to one or more applications so that the applications perform one or more operations, calculations, or instructions using one or more hardware resources of processing device 200. For example, the operating systems 224 schedule software tasks for the applications based on the thread counts indicated in the representation of asymmetry.

Figure 3:
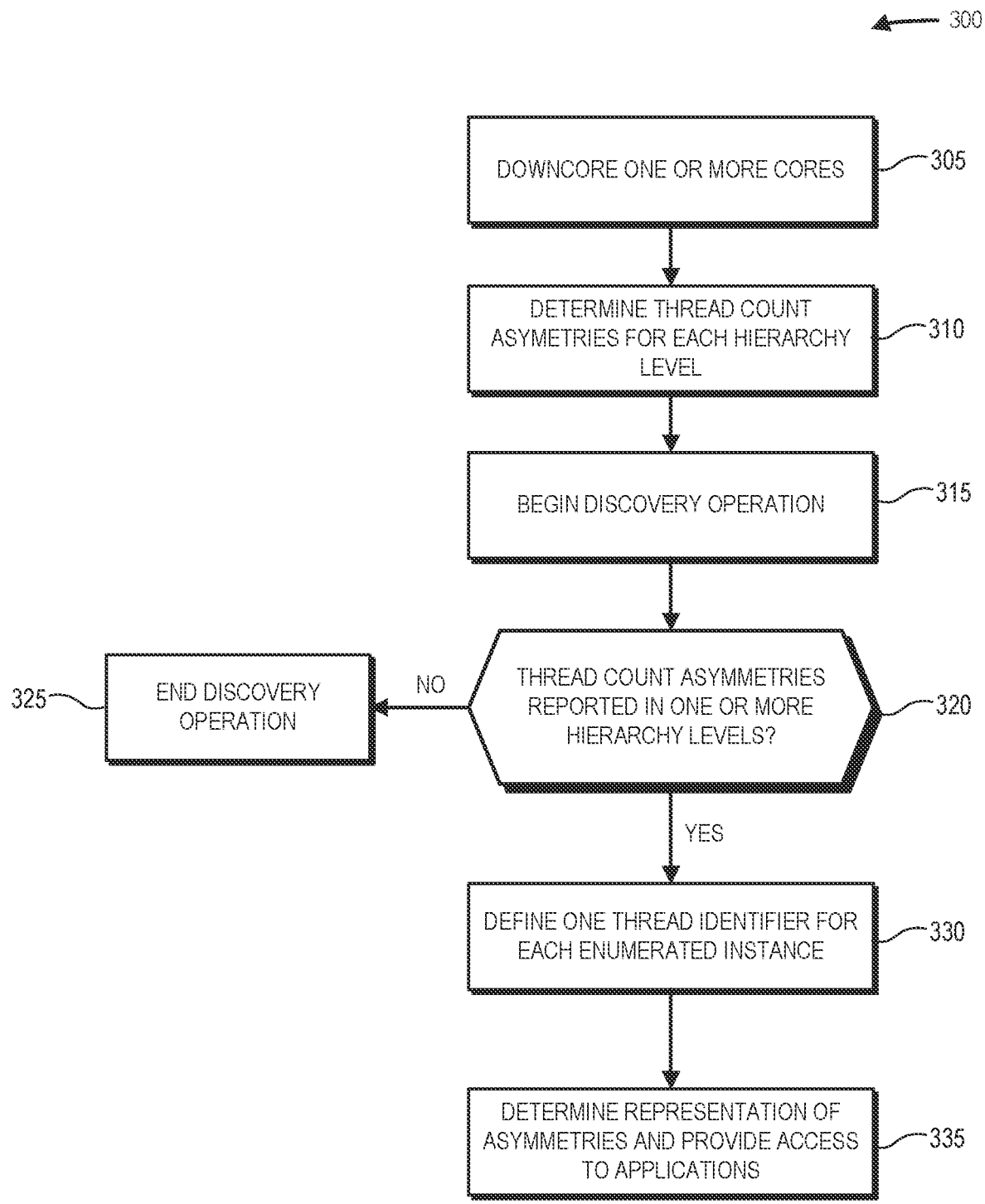
FIG. 3 is a flow diagram illustrating a method for determining a thread count asymmetry at one or more hierarchy levels, in accordance with some embodiments.

Referring now to FIG. 3, a flow diagram of an example method 300 for determining thread count asymmetries at one or more hierarchy levels is presented. At step 305, the processing device downcores one or more cores of the processing device, similar to or the same as processing device 200, to produce a disabled core. For example, one or more cores of the processing device are fuse disabled, software disabled or both. At step 310, the processing device determines one or more thread count asymmetries at one or more hierarchy levels of the processing device. For example, at startup, the processing device determines that one or more respective thread counts of enumerated instances (e.g., core, CCX, CCD) at hierarchy level device (e.g., core level, CCX level, CCD level, socket level) differ from one or more respective thread counts of another enumerated instance at the hierarchy level. That is to say, the processing device determines that one or more enumerated instances of a hierarchy level have a different number of threads from one or more other enumerated instances of the hierarchy level. In embodiments, the processing device uses microcode to determine the number of threads per enumerated instance in a hierarchy level and compares the number of threads per enumerated instance to determine one or more thread count asymmetries. Further at step 310, the processing device determines the thread identifiers, similar to or the same as thread identifiers 238, for each thread of each hierarchy level. According to embodiments, the processing device stores the determined asymmetries and thread counts in a memory including, for example, a CMOS memory, a flash memory, a PROM, an EEPROM, RAM, cache, or any combination thereof, to name a few.

At step 315, one or more operating systems, similar to or the same as operating systems 224 perform one or more discovery operations similar to or the same as discovery operations 228. In embodiments, the discovery operations each include instructions for the processing device to generate, store, or both, requested data in one or more registers, similar to or the same as registers 226. For example, a discovery operation includes instructions for the processing device to load (i.e., report) data representing any determined asymmetries, thread counts, and thread identifiers into one or more bits of the registers. For example, a discovery operation includes instructions for the processing device to load a respective bit for each hierarchy level indicating the presence or absence of a thread count asymmetry at the respective hierarchy level (i.e., a bit indicating whether a respective hierarchy level is symmetric or asymmetric with regards to thread count). In embodiments, the discovery operations include instructions to store data in one or more registers according to one or more values stored in the registers, for example, a shift value stored in the registers. As an example, the discovery operations include instructions for the processing device to store thread identifiers (e.g., APICIDs) for a respective hierarchy level in a first register based on a shift value stored in a second register indicating a bit shift of four (e.g., a logical bit shift right operation having a value of four resulting in thread identifiers that are even multiples of 16). Based on the bit shift of four, the processing device indicates that the first thread identifier for each enumerated instance of a hierarchical level will be at the thread identifier (e.g., APICID 0, 16, 32, 48, etc.) of the first register. At step 320, the operating systems determine whether one or more thread count asymmetries for one or more hierarchy levels of the processing device were reported (i.e., loaded) by the processing device into the registers. That is to say, whether each hierarchy level is symmetrical or asymmetrical with respect to thread count. For example, the operating systems read one or more bits in the operating system to determine whether one or more asymmetries were reported by the processing device. In response to determining there are no asymmetries present at any hierarchy level of the processing device (i.e., the hierarchy level is symmetrical with respect to thread count), the system moves to step 325 and ends the discovery operation. In response to determining one or more asymmetries were reported for one or more hierarchy levels, the system moves to step 330.

At step 330, in response to determining one or more asymmetries for one or more hierarchy levels, the operating systems define one thread identifier for each enumerated instance (e.g., core, CCX, CCD) in the hierarchy levels for which an asymmetry was reported. For example, in response to determining an asymmetry at a CCD hierarchy level, the operating systems determine one thread identifier for every CCX of the CCD hierarchy level. In embodiments, the operating systems are configured to determine thread identifiers by reading one or more bits indicating the thread identifiers stored in the registers. According to embodiments, the operating systems are configured to define thread identifiers by reading only the bits indicating a first thread identifier for each enumerated instance of a hierarchy level stored in the registers. The operating systems determine the location of the first thread identifiers for each enumerated instance based on one or more shift values stored in the registers. As an example, based on a bit shift of four (e.g., a logical bit shift right operation having a value of four resulting in thread identifiers that are even multiples of 16), the operating systems determine that the first thread identifier for each enumerated instance of a hierarchical level will be at the thread identifier (e.g., APICID) 0, 16, 32, 48, etc., in the register. After determining the location of the first thread identifiers for each enumerated instance in the register, the operating systems only read the first thread identifiers for each enumerated instance to determine a representation of the asymmetry (e.g., a thread count per each enumerated instance). Because the first thread identifiers for each enumerated indicate the number of threads in their respective enumerated instance, the operating systems determine a thread count for each enumerated instance of a hierarchy level without reading every thread identifier of the hierarchy level. As such, the processing time and memory resources to determine the thread count for each enumerated instance are reduced.

At step 335, the operating systems determine a representation of the asymmetry (e.g., how many threads per hierarchy level or threads per enumerated instance) and provide access to one or more hardware and software resources of the processing device to one or more applications based on the representation of the asymmetry. For example, the operating systems schedule one or more tasks for one or more applications based on a thread count indicated in the representation of the asymmetry. The applications are configured to execute or perform one or more operations using the hardware and software resources of the processing device based on the representation of the asymmetry. For example, the applications perform one or more operations using one or more threads of the processing device as scheduled by the operating systems.

Figure 4:
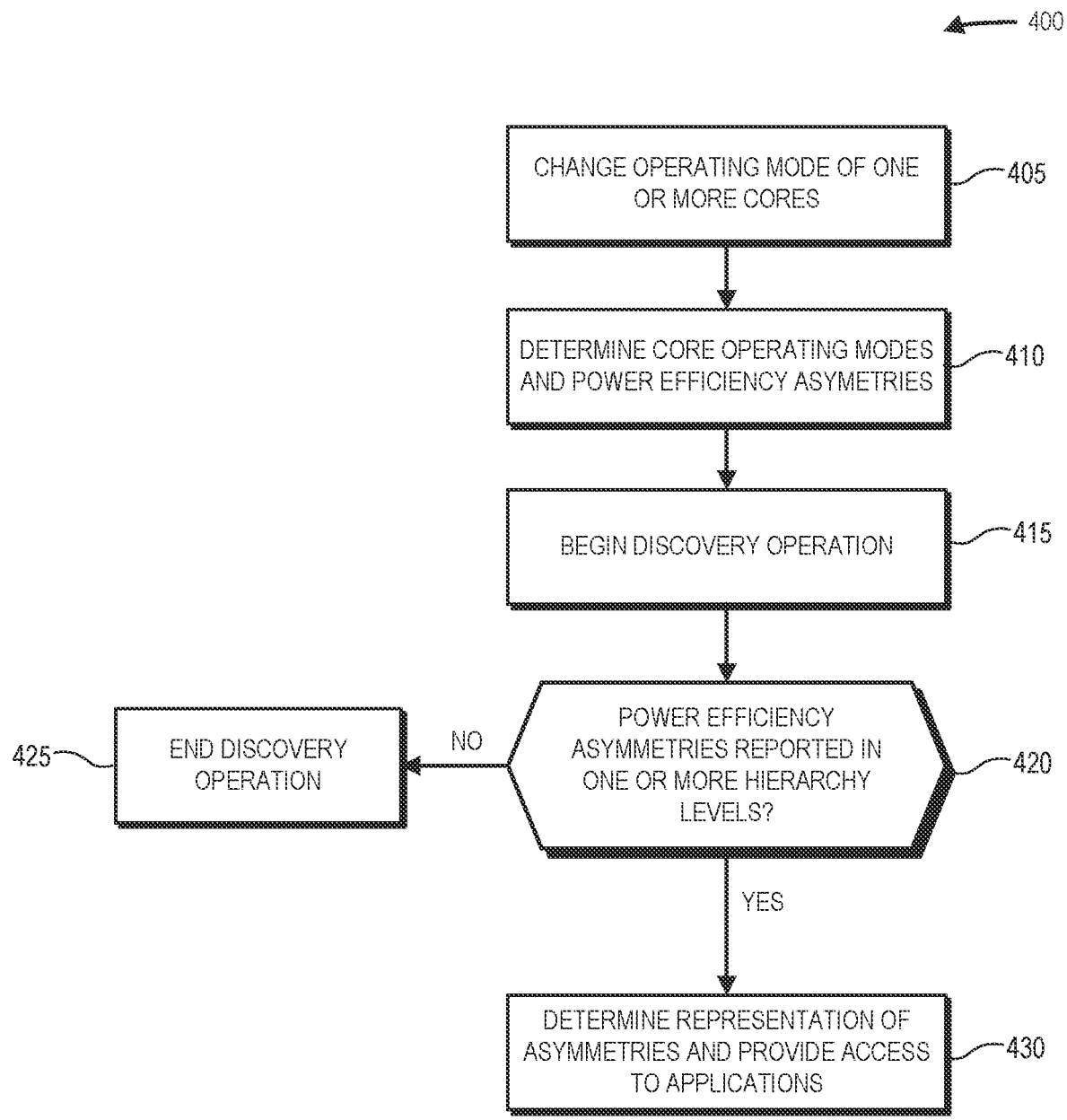
FIG. 4 is a flow diagram illustrating a method for determining a power efficiency asymmetry at one or more hierarchy levels, in accordance with some embodiments.

Referring now to FIG. 4, a flow diagram of an example method 400 for determining power efficiency asymmetries at one or more hierarchy levels is presented. At step 405, a processing device, similar to or the same as processing device 200, starts up, waits a time after start up, changes the operating mode of one or more cores of the processing device, or any combination thereof. For example, the processing device changes one or more cores operating in a power efficiency mode to a performance mode, one or more cores operating in a performance mode to a power efficiency mode, or both. As another example, the processing device starts up with a first number of cores operating in a power efficiency mode and a second, different number of cores operating in a performance mode. At step 410, the processing device determines one or more power efficiency asymmetries at one or more hierarchy levels of the processing device. For example, at startup, the processing device determines that the number of cores having a first operating mode (e.g., performance mode, power efficiency mode, density mode) within an enumerated instance (e.g., core, CCX, CCD) of a hierarchy level differs from the number of cores having the same operating mode within a different enumerated instance of the hierarchy level. That is to say, the processing device determines that one or more enumerated instances of a hierarchy level have a different number of cores in a first operating mode (e.g., performance mode, power efficiency mode, density mode) from one or more other enumerated instance of the hierarchy level.

At step 415, one or more operating systems, similar to or the same as operating systems 224 perform one or more discovery operations similar to or the same as discovery operations 228. In embodiments, the discovery operations each include instructions for the processing device to generate, store, or both, requested data in one or more registers, similar to or the same as registers 226. For example, a discovery operation includes instructions for the processing device to load (i.e., report) data representing any determined power efficiency asymmetries into one or more bits of the registers. For example, a discovery operation includes instructions for the processing device to load a respective bit for each hierarchy level indicating the presence or absence of a power efficiency asymmetry at the respective hierarchy level (i.e., whether a respective hierarchy level is symmetrical or asymmetrical with regards to power efficiency). At step 420, the operating systems determine whether one or more power efficiency asymmetries for one or more hierarchy levels of the processing device were reported (i.e., loaded) by the processing device into the registers. For example, the operating systems read one or more bits in the operating system to determine whether one or more power efficiency asymmetries were reported by the processing device. In response to determining there are no power efficiency asymmetries present at any hierarchy level of the processing device (i.e., all hierarchy levels are symmetrical with regards to power efficiency), the system moves to step 425 and ends the discovery operation. In response to determining one or more power efficiency asymmetries were reported for one or more hierarchy levels, the system moves to step 430.

At step 430, in response to determining one or more power efficiency asymmetries for one or more hierarchy levels, the operating systems determine a representation of the asymmetry. For example, the operating systems determine the operating mode of one or more cores within an asymmetrical hierarchy level. According to embodiments, the operating systems provide access to one or more hardware and software resources of the processing device based on one or more determined representations of the power efficiency asymmetries. For example, the operating systems schedule one or more software tasks of one or more applications based on one or more operating modes for respective cores indicated in a representation of a power efficiency asymmetry. In embodiments, the applications are configured to execute or perform one or more operations using the hardware of the processing device based on the representations of the power efficiency asymmetries. For example, the applications perform one or more operations using one or more cores of the processing device in a first mode (e.g., power efficiency mode) and one or more cores of the processing device in a second mode (performance mode) based on the needs of the application.

In some embodiments, the apparatus and techniques described above are implemented in a system including one or more integrated circuit (IC) devices (also referred to as integrated circuit packages or microchips), such as the system described above with reference to FIGS. 1-4. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   in response to determining a thread count asymmetry at a hierarchy level of a processing device, defining a thread identifier for each enumerated instance at the hierarchy level to produce a representation of the asymmetry at the hierarchy level; and
   scheduling one or more tasks based on the representation of the asymmetry at the hierarchy level.

2. The method of claim 1, further comprising:
   determining a second thread count asymmetry at a second hierarchy level of the processing device, wherein the second hierarchy level includes one or more dies including an enumerated instance at the hierarchy level; and
   defining only one thread identifier for each die within the second hierarchy level of the processing device.

3. The method of claim 1, wherein only one thread identifier for each enumerated instance within the hierarchy level of the processing device is defined to produce the representation of the asymmetry at the hierarchy level.

4. The method of claim 1, further comprising:
   determining a thread count symmetry at a second hierarchy level of the processing device.

5. The method of claim 1, further comprising:
   accessing a first portion of a register configured to store a thread identifier associated with a first enumerated instance of the hierarchy level and a second portion of the register configured to store a thread identifier associated with a second enumerated instance of the hierarchy level.

6. The method of claim 1, wherein the thread identifier for each enumerated instance is based on a shift value stored in a register.

7. The method of claim 1, further comprising:
   disabling a first core of the processing device to produce a disabled core, wherein the thread count asymmetry is based on the disabled core.

8. The method of claim 7, wherein the disabled core is fuse disabled.

9. The method of claim 7, wherein the disabled core is software disabled.

10. A system, comprising:
    a memory; and
    a processing device including one or more processing cores, the processing cores configured to:
    determine a thread count asymmetry at a hierarchy level of the processing device; and
    perform a task of an application based on the thread count asymmetry.

11. The system of claim 10, the one or more processing cores further configured to:
    determine a thread count for each enumerated instance of the hierarchy level.

12. The system of claim 10, the one or more processing cores further configured to:
    determine a thread count symmetry at a second hierarchy level of the processing device.

13. The system of claim 10, the one or more processing cores further configured to:
    determine a thread identifier for each enumerated instance of the hierarchy level based on a bit stored in a register.

14. The system of claim 10, the one or more processing cores further configured to:
    disable a processing core of the processing device to produce a disabled core, wherein the thread count asymmetry is based on the disabled core.

15. The system of claim 10, wherein the hierarchy level comprises a die level of the processing device.

16. The system of claim 10, wherein the hierarchy level comprises a core complex level of the processing device.

17. A system, comprising:
    a memory; and
    a processing device including one or more processing cores, the processing cores configured to:
    determine a power efficiency asymmetry at a hierarchy level of the processing device based on a number of cores operating in an operating mode in the hierarchy level; and
    perform a task of an application based on the power efficiency asymmetry at the hierarchy level of the processing device.

18. The system of claim 17, the one or more processing cores further configured to:
    change a processing core of the processing device from the operating mode to a second operating mode.

19. The system of claim 18, the one or more processing cores further configured to:
    determine the power efficiency asymmetry at the hierarchy level of the processing device further based on a number of cores operating in the second operating mode in the hierarchy level.

20. The system of claim 18, wherein the operating mode comprises a power efficiency mode and the second operating mode comprises a performance mode.

* * * * *